United States Patent
Nagarajan et al.

(10) Patent No.: US 7,894,679 B2
(45) Date of Patent: Feb. 22, 2011

(54) DATA TRANSFERABILITY PREDICTOR

(75) Inventors: Ramesh Nagarajan, Pittsford, NY (US);
Kari Poysa, Macedon, NY (US);
Michael Barrett, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1519 days.

(21) Appl. No.: 11/170,490

(22) Filed: Jun. 29, 2005

(65) Prior Publication Data
US 2007/0002391 A1    Jan. 4, 2007

(51) Int. Cl.
*G06K 9/36* (2006.01)
(52) U.S. Cl. .................. 382/232; 382/236; 382/237; 382/238
(58) Field of Classification Search .................. 382/232, 382/236, 237, 238, 239, 224; 358/1.9, 533, 358/534, 505, 426.07, 426.11
See application file for complete search history.

(56) References Cited

U.S. PATENT DOCUMENTS

| | | | |
|---|---|---|---|
| 5,208,681 A | 5/1993 | Yoshida | |
| 5,930,003 A | 7/1999 | Kondo | |
| 6,198,850 B1 | 3/2001 | Banton | |
| 6,307,962 B1 * | 10/2001 | Parker et al. | 382/170 |
| 2001/0030762 A1 | 10/2001 | Shibata et al. | |
| 2002/0102027 A1 | 8/2002 | Miyake et al. | |
| 2002/0131097 A1 | 9/2002 | Nakamura | |
| 2004/0114195 A1 | 6/2004 | Ebner | |

FOREIGN PATENT DOCUMENTS
JP    4-35570 A    2/1992

OTHER PUBLICATIONS
Extended European Search Report for European Patent Application No. 06116281.4, mailed Aug. 5, 2010.

* cited by examiner

*Primary Examiner*—Anh Hong Do
(74) *Attorney, Agent, or Firm*—Pillsbury Winthrop Shaw Pittman LLP

(57) ABSTRACT

Present systems and methods provide for adaptive job-size prediction that can enable the user of a scan-to-export function to obtain continuing feedback as original documents are being scanned, regarding the transferability of a scanned and processed data file. The compression method that is selected to process a scanned image is used to predict the output size for the associated data and to provide an estimated size for the job. The estimated size of the data being prepared for output is compared to the amount of storage space that is available at the target device and if the estimate exceeds available space, a signal is generated to terminate the scan or take other appropriate action. The user is also immediately notified if the transfer will fail for other reasons, such as the entry of an invalid target destination address or invalid user authentication.

20 Claims, 6 Drawing Sheets

DATA TRANSFERABILITY PREDICTOR

BACKGROUND

Illustrated herein, generally, are systems and methods for providing continuing communication between networked devices and more particularly, to enabling a device configured to run a "scan-to-export" program to communicate with a connected target device during the scanning process.

BACKGROUND

Image reproduction devices commonly provide "scan-to-export" features to enable users to digitally capture hardcopy document images for transfer to other devices. For example, "scan-to-e-mail," "scan-to-mailbox" and "scan-to-network" features can generate digital representations of original documents and transmit them as email attachments, deliver them to electronic mailboxes or transfer them to remote network servers, respectively.

Available scan-to-export methods and systems require all of the pages in a job to be scanned and processed, the connection between the sending device and the target to be established and the sending device to submit a request to transfer the completed file before the user can determine whether the target will grant the transfer request. If the target denies the request, the job will only be transferred if the user repeats the entire process and the target device grants the transfer request. In other words, all of the pages must be re-scanned, the data must be re-processed, the connection to the target must re-established, the file transfer request must be re-submitted to the target and the target must grant the re-submitted request. Further, since many users leave the scanning device as soon the last page of the job exits the document feeder, several minutes, hours or even days may pass before they learn that the request was denied by the target. This can be a significant problem for systems that capture the scanned data while the user is present, then store it for processing and/or transfer at some later time. In a worst case scenario, the user may discard the originals soon after they are scanned and permanently loose the data.

It would be beneficial to provide a way to indicate, while original documents are still being scanned, whether the target device will ultimately accept the request to transfer the completed job and also, to facilitate transactional scan processing.

SUMMARY

Aspects of present systems and methods provide a digital imaging device that includes a scanner configured to generate a continuous tone representation of an original document image; an image processor configured to generate a compressed output optimized image corresponding to the continuous tone original document image representation, the image processor being further configured to prepare the compressed output optimized image for export to an electronically connected device and to predict an estimated size of the compressed output optimized image; and a network interface configured to transmit the compressed output optimized image and the compressed output optimized image estimated size to a networked device.

In one aspect, a method includes receiving scanned image data that represents an original document image; based upon an original document image content, selecting a method of generating a compressed output image that corresponds to the scanned image data; and based upon the original document image content and the selected compression method, providing an estimated output size for the compressed output optimized image.

In yet another aspect, a data receiving device includes a polling data receiver configured to receive a query from a remote device that includes an identifier for the remote device and an estimated size of a compressed output optimized image being generated by the remote device; and a polling data transmitter configured to transmit a response to the remote device that indicates whether the data receiving will accept a compressed output optimized image having a size approximately equal to the compressed output optimized image size estimate.

In still another aspect, a data receiving device includes a polling data receiver configured to receive a query from a remote device that includes an identifier for the remote device and an estimated size of a compressed output optimized image being generated by the remote device; and a polling data transmitter configured to transmit a response to the remote device that indicates whether the data receiving will accept a compressed output optimized image having a size approximately equal to the compressed output optimized image size estimate.

DETAILED DESCRIPTION

The following term(s) have been used to describe various aspects of the present systems and methods:

"Image processing" means manipulating data that represents text, graphical or pictorial information to achieve a desired result.

"Scan2export" and "scan-to-export" refer to a process that digitally captures an image from a hardcopy document and prepares it for transfer to another device.

The terms "file transferability" and "data transferability" refer to the ability of a receiving device to accept data/files from a sending device.

"Information" refers to a message that has meaning in some context, which is typically presented in a format that is suitable for human interpretation.

"Data" refers to a set of symbols or characters that may be manipulated, communicated and/or interpreted to convey information.

"Data compression" means reducing the volume of data that represents a given item of information.

A "compression ratio" is a numerical value that shows the size relationship between an original set of data and a processed set of data that carries the same information. Conventionally, a high compression ratio indicates that the processed data set is much smaller than the original data set.

"Polling" refers to the continuous checking by one device of one or more other programs or devices to receive communications.

"Redundant data" is data that provides duplicative or unnecessary information.

Data is "non-essential" when it is not required to provide the minimum acceptable image quality for the selected application.

"Output optimized image data" is data that provides optimal output when processed using a specified program, application and/or device.

A "compressed output optimized image" is file that represents a scanned image captured from an original document, which has been fully processed and compressed for output.

"Transactional scan processing" refers to a feature that provides a confirmation at the sending device when a scan-to-export job is successfully transferred to and/or processed at the target device.

Figure 1:
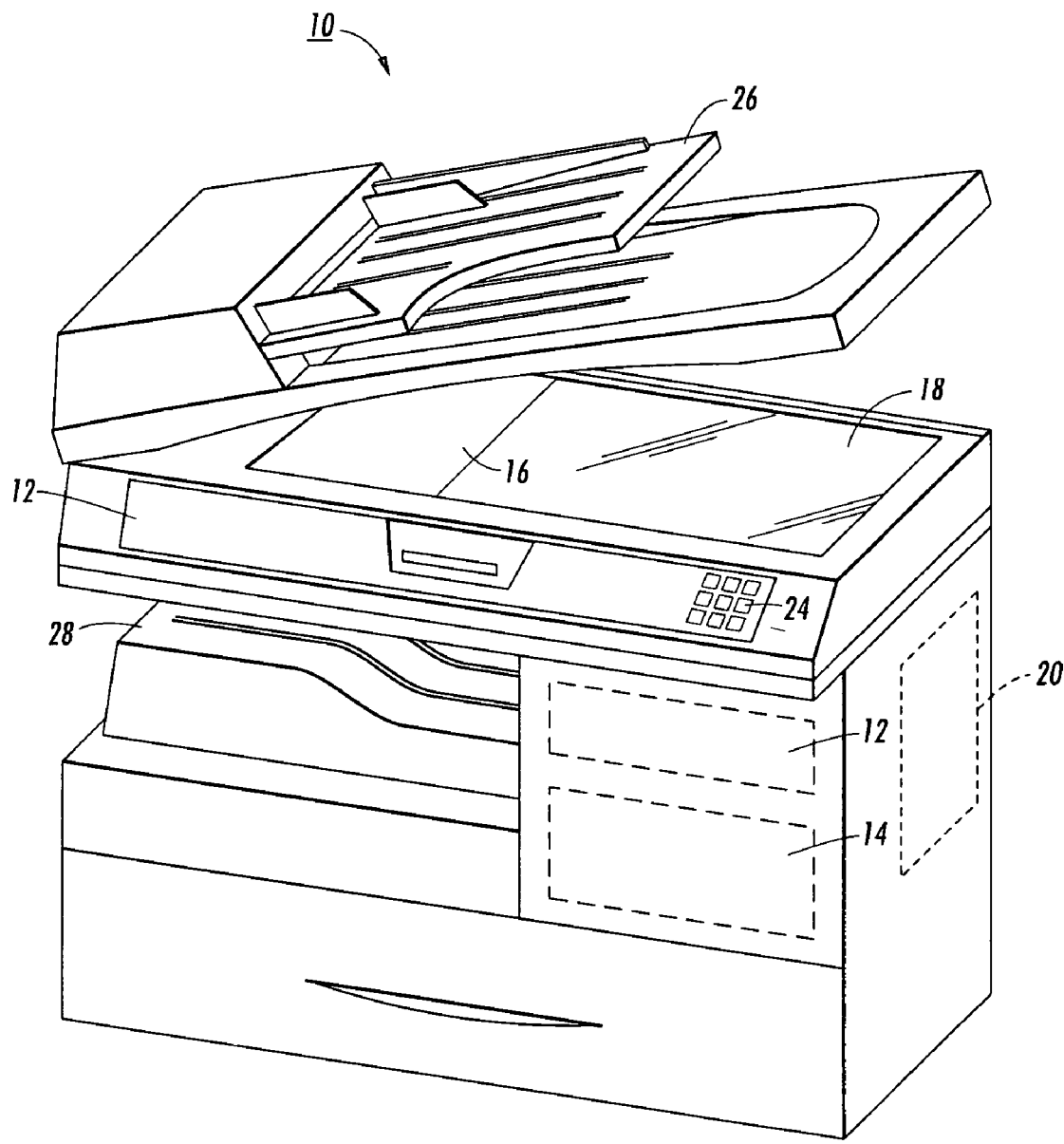
FIG. 1 provides an example of a digital reproduction system that may be used to operate a scan-to-export feature.

Present systems and methods are described herein with reference to the multi-function device (MFD) 10 shown in FIG. 1. It is understood, however, that other image reproduction systems and devices could be used. In the example shown, MFD 10 includes a scanner 12 that digitally captures images from hardcopy original documents 16 that are positioned on a scanning platen 18. MFD 10 also includes an image processor (IP) 20 that optimizes the image data generated by scanner 12 for output and a digital color printer 14 that generates hardcopy reproductions of the processed image data. MFD 10 of FIG. 1 also has a user interface (UI) 22 with a telecommunications key pad 24 that can be used to establish connections to remote devices over a telecommunications channel and has a document feeder 26 that can be used to transport original documents 16 to platen 18 and an output tray 28 that can be used to collect hardcopy output.

Figure 2:
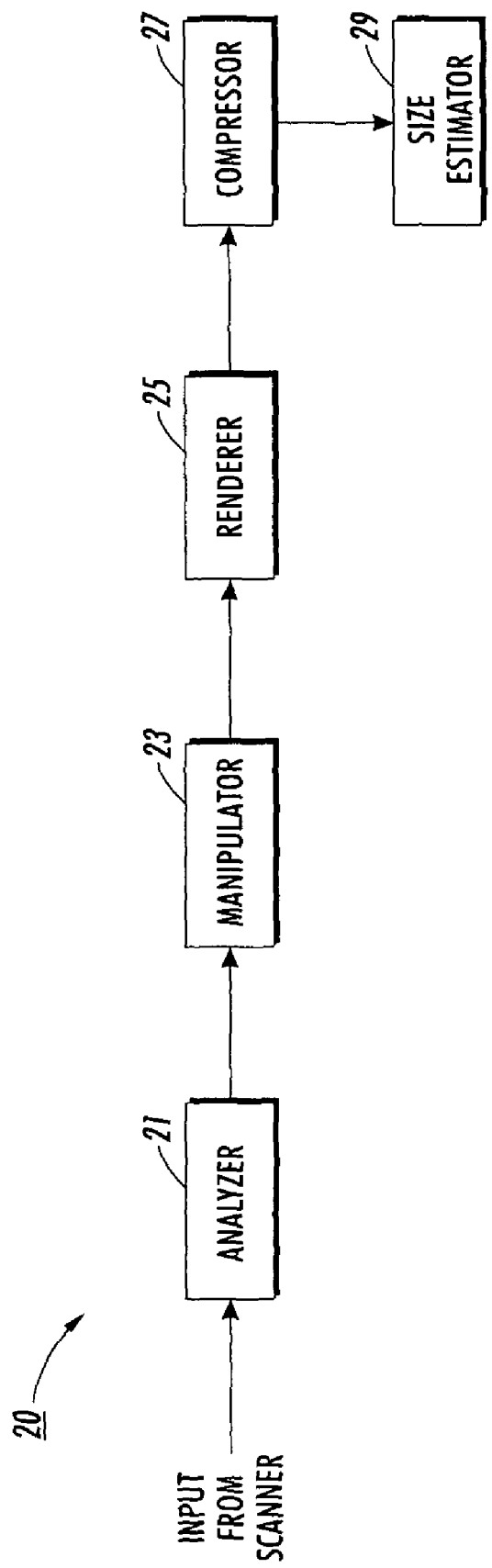
FIG. 2 is a block diagram showing the primary functional aspects of an image processing system that may be used to operate present systems and methods.

Present systems and methods may perform a scan-to-export function using an IP 20 with the functional aspects shown in FIG. 2. Generally, IP 20 includes an image analyzer (IA) 21 that pre-process the data generated by scanner 12 in real-time, for example, to improve contrast, remove noise, segment the image and/or perform other initial operations. IP 20 usually includes an image manipulator (IM) 23 that modifies the scanned data in accordance with one or more sets of predefined instructions and may also process it to correct skew and provide masking, cropping and other enhancements that improve its appearance and an image renderer (IR) 25 that processes the scanned data to generate image data that is optimized for a selected type of output. For example, IR 25 may generate image data that is optimized for display on a video monitor, for permanent storage or to provide printed hardcopies. Most often, IP 20 also includes an image compressor (IC) 27 that compresses the output optimized image data, i.e., reduces the amount of data in the output optimized image, so it will require less storage space and so it can be transmitted more efficiently.

In one aspect, an IP 20 used by present systems and methods includes an image size estimator (SE) 29 that estimates the size of the compressed output image data while the corresponding job is being scanned. When a job has multiple pages, SE 29 may provide an estimated size for the entire job. In one aspect, SE 29 may add the estimated size of the compressed output image data corresponding to each original document 16 to the sum of the estimated sizes of the compressed output image data for all of the previously scanned pages. While FIG. 2 shows an example of an IP 20 that may be used with present systems and methods, it is understood that other arrangements are possible and that the described processing functions need not be performed in the order shown.

Compression methods typically seek to reduce the volume of an image data file without degrading image quality. Generally, such methods identify and eliminate redundant data and/or data that is non-essential to the appearance of the image. For example, since small changes in luminance and chrominance are not detected by the human visual system, at least some luminance and/or chrominance data can usually be eliminated from a color image. In contrast, since the visual system is very sensitive to changes in spatial resolution, very little data can be eliminated from text and other images with sharp edges without causing a reduction in image quality.

Further, the amount of space that is required to store an image depends upon both the amount of data being processed (e.g., how many pixels are turned on to generate the image) and the method that is used to compress the data. For example, a full color, 8.5×11, mixed raster content (MRC) image (which contains both graphics and text) scanned at 300×300 dpi would typically generate an uncompressed image approximately 25 MB in size. If the image were compressed using a JPEG low quality quantization table, the amount of space required to store the compressed image could be as little as 5% (i.e., 1.25 MB) of that required for the uncompressed image. However, if the same image were instead compressed using a JPEG high quality quantization table, the amount of required space would probably be as much as 50% (i.e., 12.5 MB) of that required to store the uncompressed image.

The amount of data reduction that is achieved using a given technique also varies with image content. For example, if scanned, monochrome, pictorial image and scanned, monochrome, text image are both compressed using JPEG, the size of the compressed monochrome pictorial image will probably be much smaller than that of the compressed monochrome text image. If the pictorial image is in color rather than monochrome, the differences in size for the compressed images is likely to be even larger. To accommodate the varying needs of different types of images, IP 20 typically has access to several different data compression methods and is programmed to select the method that will achieve the highest compression ratio without degrading the quality of the scanned image for the type of data that is being captured.

For example, IP 20 may have the Lempel-Ziv Welch (LZW), CCITT G4, JPEG and JBIG2 compression methods stored memory and be programmed to use LZW for images that are highly patterned, to use CCITT G4 for images that contain scanned text, to use JPEG for images that have significant amounts of color and detail and to use JBIG2 for monochrome images. Accordingly, as an original document 16 is scanned, IP 20 analyzes the data to identify its content and selects the compression method that is most appropriate.

Figure 3:
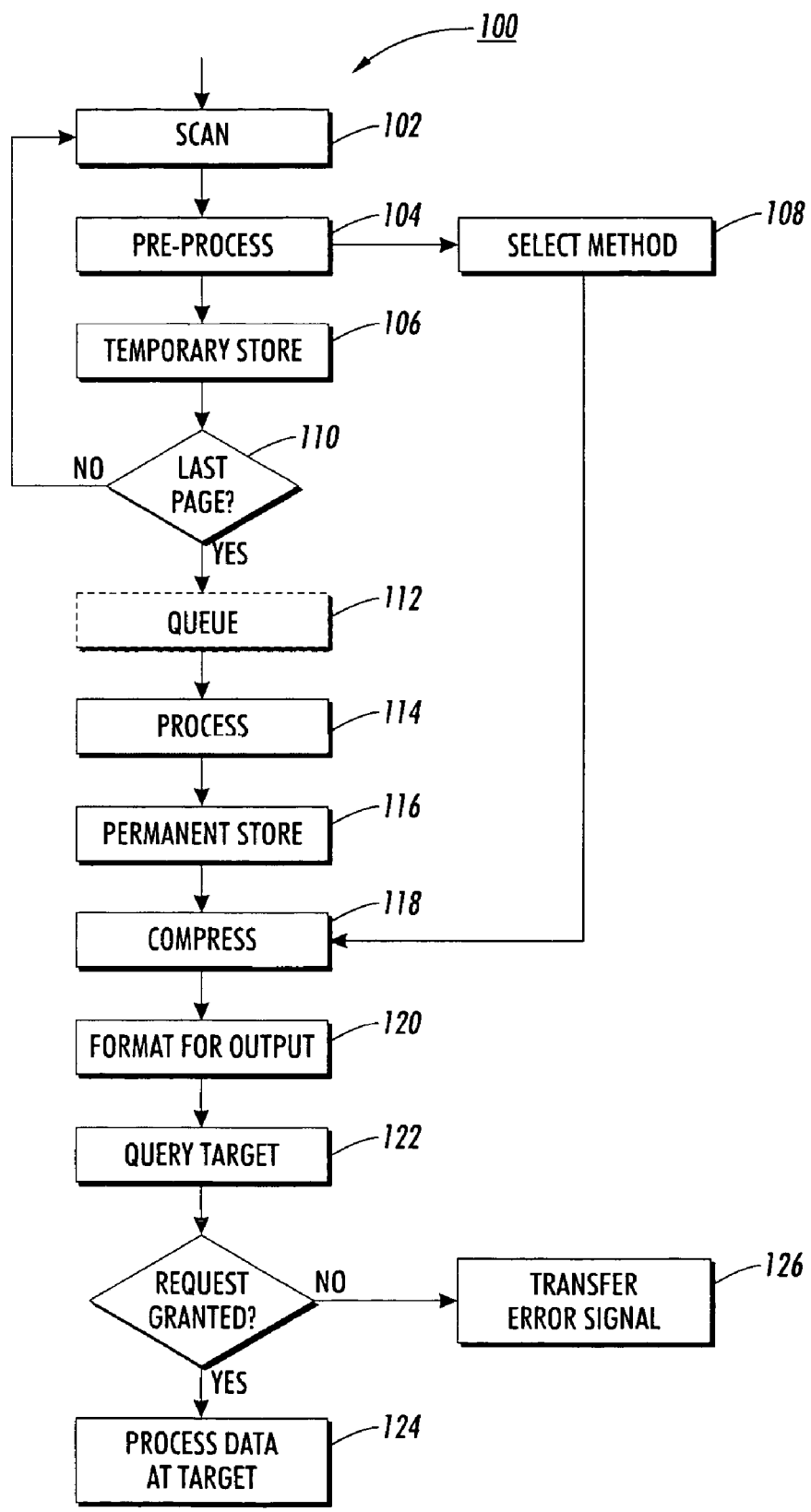
FIG. 3 is a flow diagram showing the steps that are performed during a typical scan-to-export process.

FIG. 3 is a flow diagram showing a typical scan-to-export method 100. At the start of the process, scanner 12 generates a continuous tone representation of a scanned original document 16 as indicated in block 102. The scanned image data is then forwarded to IP 20 for pre-processing as shown in block 104 and the pre-processed data is placed in temporary storage as shown in block 106. During pre-processing, IP 20 performs several tasks, including selecting the appropriate compression method for the identified content as shown at block 108. When a job includes more than one page, the above described steps are repeated as indicated at block 110.

It is usually very expensive to process and store all of the image data generated during a scan quickly enough to keep pace with the scanning rate. Accordingly, scanner 12 may remain idle until image processing is completed or, as in the example of FIG. 3, the image data may be placed in a queue as shown in block 112 and subjected to full processing offline as shown in block 114 in order to increase throughput (it is noted that in a lower throughput system, the step at block 114 will replace that shown at block 106 and block 112 will be omitted). The processed data is then placed in permanent storage as shown at block 116 and compressed as shown in block 118, using the method selected at block 108. Headers and/or other required information is then added as shown in block 120 to format the file for output.

Once the above described processing has been completed, MFD 10 queries the target device as shown in block 122 to request to transfer the scanned file. If there is sufficient storage space, the target will grant the request, the file will be transferred and the data will be processed at the target as shown at block 124. If the request is denied, an error message is generated at UI 22 as shown in block 126 and the file is deleted from storage.

Present systems and methods provide continuing communication between the sending and target devices while original documents 16 are being scanned, to enable MFD 10 to determine in advance whether the target will grant its request to transfer the compressed output optimized image. More specifically, present systems and methods use the compression method that is selected by IP 20 at block 108 of FIG. 3 to estimate the size of the file for the compressed output optimized image corresponding to original documents 16 as they are being scanned.

Figure 4:
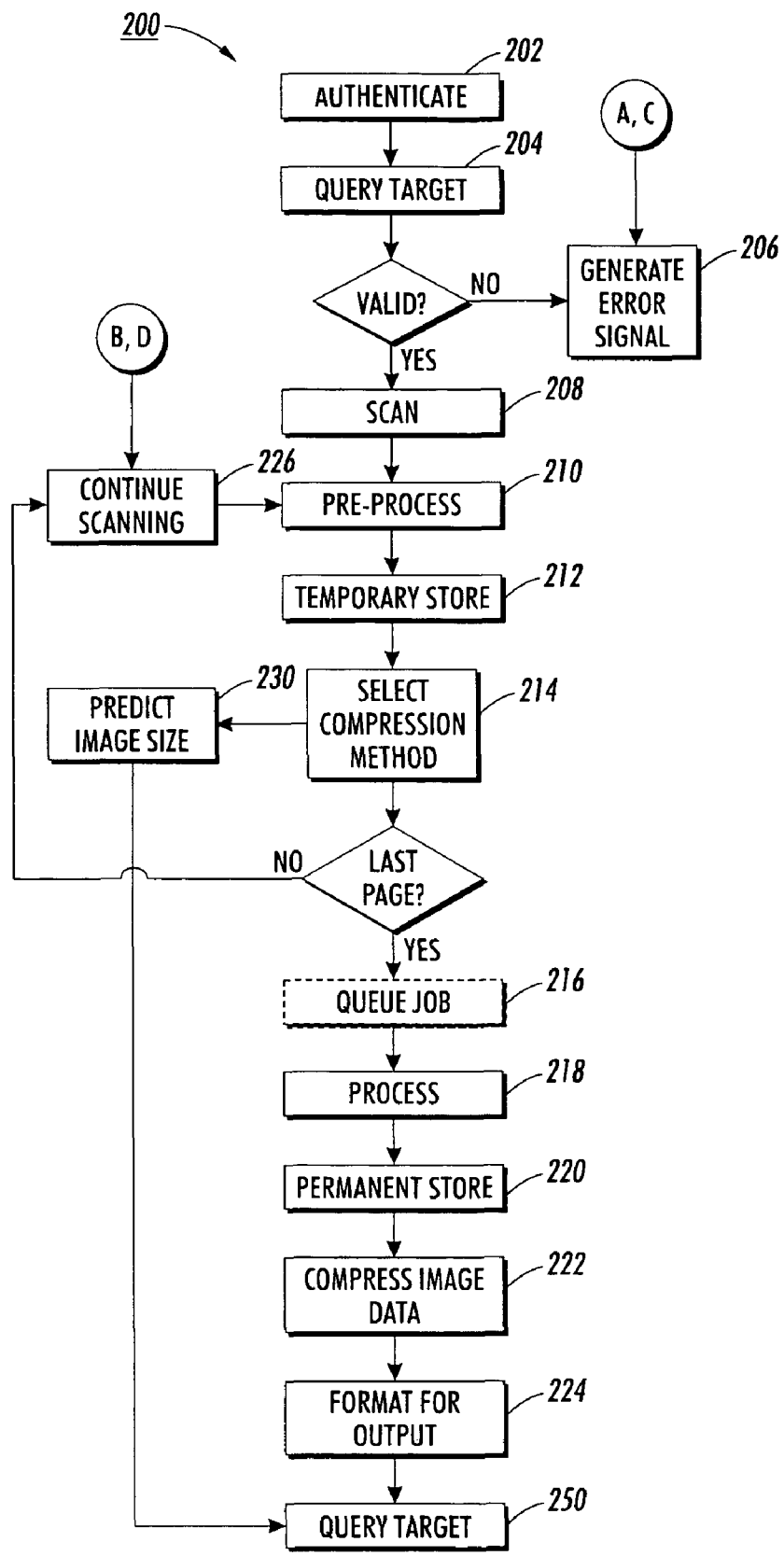
FIG. 4 is a flow diagram showing an example of how present systems and methods may be used by an image reproduction system that transmits data using a scan-to-export process.

One example of a method 200 of the present systems and methods is shown in the flow diagram of FIG. 4. As shown in block 202, a user name, password and/or other authentication data may be entered at UI 22 to enable the target device to identify the user and/or system and validate access rights. Authentication data may also include the network address for the MFD 10 or target device, or other information that is required before the target device will accept communications from networked devices.

In one aspect, MFD 10 queries the target destination soon after the authentication data is entered as shown in block 204. Accordingly, if the target cannot validate the data that has been entered as shown at block 228, if the memory at the target destination is full or it is apparent that the target would ultimately deny the file transfer request for some other reason, an error signal can be generated as shown in block 206 before scanning even begins. If the authentication data is valid, the next steps are similar to those for method 100 of FIG. 3. That is, original document 16 is scanned at block 208, pre-processed at block 210, placed in temporary storage at block 212 and the compression method that will be used to process the image data is selected as shown in block 214.

In one aspect, present systems and methods forward the output of the compression method selection shown in block 214 to an image size predictor, which estimates the size of the fully scanned and processed compressed output optimized image as shown in block 230. Methods and systems for predicting the size of a compressed output optimized image are known and present systems and methods are not limited to using any particular technique.

In one aspect, present systems and methods may estimate the size of a compressed image using a lookup table that associates image content and the selected compression method with a compression ratio. For example, a look up table may assign a compression ratio of 40:1 to mixed raster content (MRC) images (i.e., images that include multiple types of data such as text and graphics) that are compressed using JBIG2. In such a case, SE 29 would predict an output size of 600 KB for the previously described 8.5×11, color, MRC image scanned at 300×300 dpi.

In another aspect, when a job has multiple pages, SE 29 may estimate the size of one or more images that are scanned and compressed later in the job using the actual, average, or other available compression ratio obtained when one or more pages are scanned and compressed earlier. In one aspect, if IP 20 is capable of processing earlier scanned pages while subsequent original documents 16 are being scanned, SE 29 can increase the accuracy of the size estimate for the fully compressed image by providing actual output sizes for earlier scanned pages while pages at the end of the job are still being scanned, processed and formatted.

US Patent Publication No. 20040114195 provides another example of a method and system for estimating the compression ratio for an image data set that present systems and methods may use to estimate compressed image size. As described, the method includes determining a number of on-pixels in the image data set, performing a morphological operation on the image data set, yielding a processed image data set that includes processed on-pixels, deriving a metric from a relationship between a number of on-pixels in the image data set and a number of processed on-pixels in the processed image data set and using the metric to estimate a compression performance associated with the image data set. In one aspect, a "morphological operation" includes deriving, for each of a plurality of windows, each window including a plurality of pixels in the image data set, a processed pixel, with the processed pixel being a processed on-pixel if there exists a predetermined threshold number of on-pixels in the window.

It is understood that present systems and methods estimate the size of the compressed output image use one of the methods described above as well as in numerous other ways and that present systems are not limited to these examples. As before, the scanned data may optionally be placed in a queue as shown in block 216 and the image data may be processed off-line as shown in block 218 to increase throughput, then placed in permanent storage as shown in block 220, compressed as shown in block 222 and formatted for output as shown in block 224.

As each scanned image is processed, MFD 10 queries the target as shown in block 250 to determine whether the predicted job size exceeds the available storage space. These queries and the associated responses may be provided in many ways. For example, a query may include a request for the target to report the amount of available storage space and MFD 10 may compare it to the estimated size of the compressed output optimized image to determine whether the target would grant a transfer request. In another aspect, the query may include the estimated size of the compressed output optimized image and the target device may respond by sending a binary or other response that indicates whether a request to transfer a file having the estimated size would be granted. In yet another aspect, when a query includes the estimated size of the compressed output optimized image, the target may respond when a specified condition is met. For example, the target could signal MFD 10 to stop scanning if the file is too large for it to grant a transfer request or it could respond with a "OK" signal when the available storage space is sufficient and MFD 10 may be configured to continue scanning only upon receipt of the OK signal.

In another aspect, target device queries may be used to provide continuous updates of the ability of the target to transfer the file being scanned as image data is captured from the original document. In one aspect, present systems and methods may query the target device as shown at block 250 using a standard polling process. For example, MFD 10 may continuously establish connections to the target device while a job is being scanned to obtain updated information regarding the ability of the target device to grant a request to transfer the corresponding compressed output optimized image. In one aspect, polling may take place at regular periodic intervals, while in other aspects MFD 10 may poll the target upon the completion of scanning of an original document 16, upon the completion of compression of a scanned image or at some other interval. As before, these queries could include a request for a report of the available storage space so MFD 10 can assess file transferability or they could include the estimated size of the compressed output optimized image for the target to indicate whether it will grant or deny the transfer request. It is understood that queries could be made in numerous ways and that present systems and methods are not limited to these examples.

Figure 5:
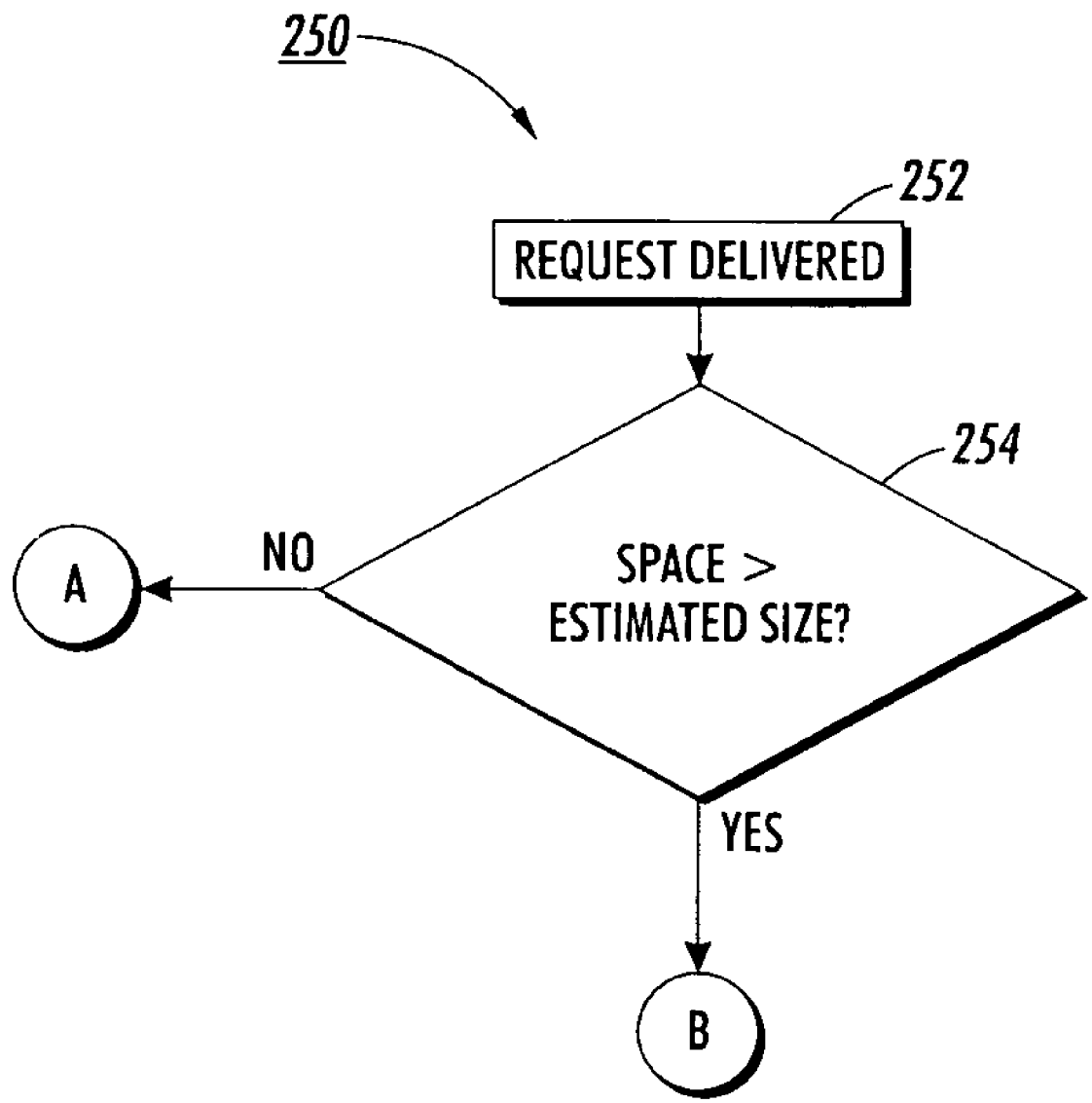
FIG. 5 is a flow diagram showing an example of how present systems and methods may be used by a device that receives data via a scan-to-export process.
Figure 6:
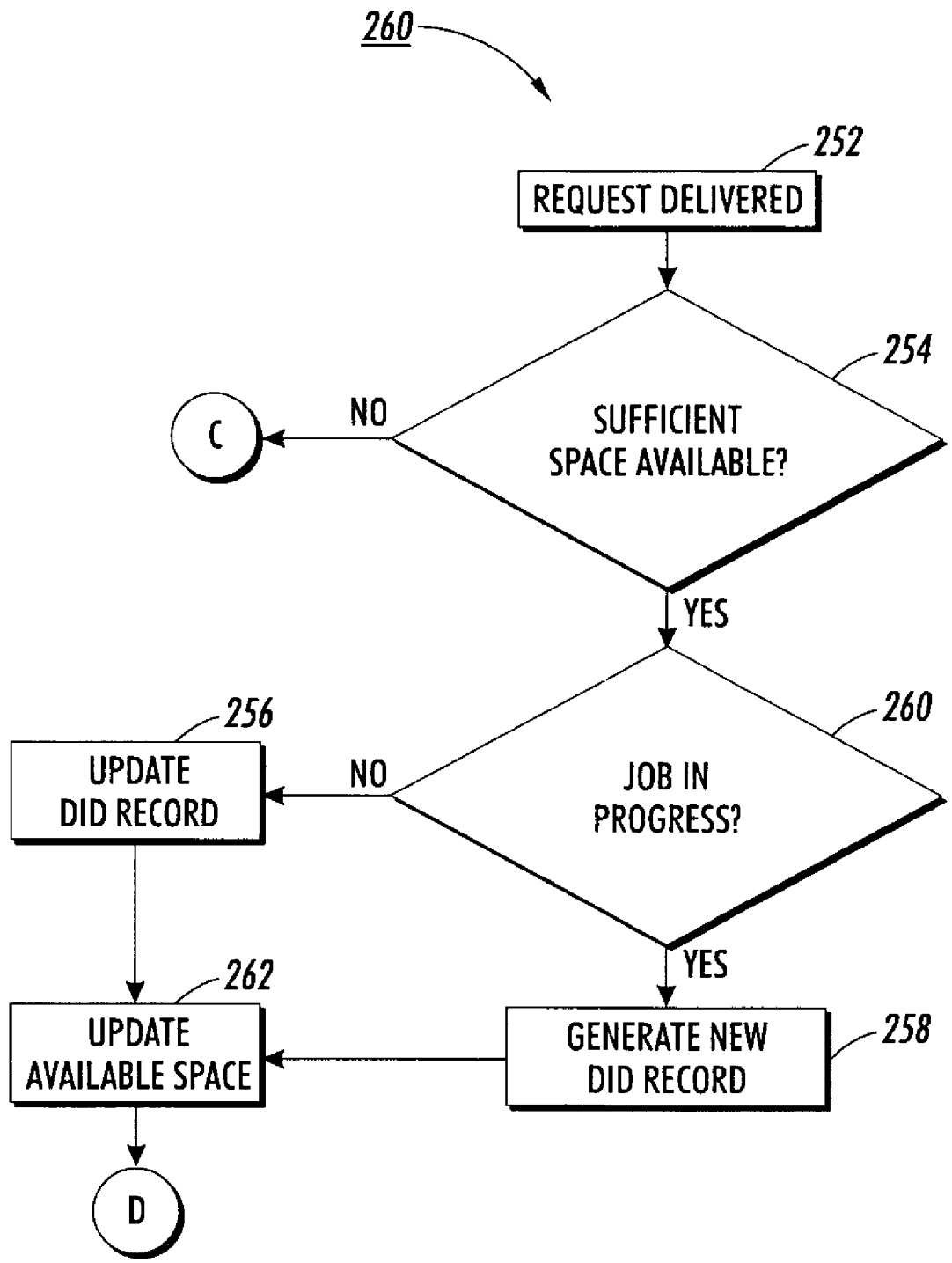
FIG. 6 is a flow diagram showing an example of how present systems and methods may be used to provide accurate data transferability information in a system with a target device that is capable of communicating with multiple sending devices.

FIG. 5 shows on example of how MFD 10 present systems and methods may poll a target device to submit queries as indicated in block 250. Once the query is delivered to the target device as shown in block 252, the target determines whether the available storage space exceeds the estimated size of the compressed output optimized image as shown in block 254. If there is sufficient storage space to store a compressed output optimized image having the estimated size, scanning continues as shown in block 226 (FIG. 4). However, if the estimated size of the compressed output optimized image exceeds the available storage space, an error signal is generated as indicated in block 206 (FIG. 4) to notify the user.

The error signal of block 206 may be accompanied by a visible, audible or other function to alert the user that the file is too large for transfer. In addition, the manner in which the notification signal is generated may be controlled by file storage protocols for MFD 10 or the signal generation may be the same for all protocols. In one aspect, the scanning process may be automatically terminated when the error signal is generated and the user will be required to decide how to proceed. For example, the user may decide to remove all of the original documents 16 and re-start the entire job at another time. If a reduction in image quality is acceptable, the user instead may choose the estimated size information from the address associated with the DID and update the data.

In either case, the target maintains updated available space information as shown at block 262 as scanning continues (see block 228 of FIG. 4). For example, when there is no previous record for a DID, the target device may recalculate the available space by deducting the estimated size from the current amount of available space and when the DID has already been recorded, the target device may deduct the difference between the current and the previous estimated sizes for the compressed output optimized image from the current amount of available space.

Thus, present systems and methods can use the DID to record the estimated size of a file being scanned by each sending device when multiple sending devices simultaneously communicate with a single target. Accordingly, the target can provide accurate information regarding the transferability of a file that is being scanned and/or it can reserve sufficient storage space to receive data from the sending device that is associated with a specific DID. In one aspect, when the file is transferred or scanning is aborted, the target can delete or update the DID so new jobs that are being submitted by the same MFD 10 can be identified and to free storage space that is no longer needed after a file is transferred or scanning is aborted.

While present systems and methods have been described in the context of scanned images, it is understood that they can readily be applied to other types of data and in other types of communications.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A digital imaging device, comprising:
   a scanner configured to generate a continuous tone representation of an original document image;
   an image processor configured to generate a compressed output optimized image corresponding to said continuous tone original document image representation, said image processor being further configured to prepare said compressed output optimized image for export to an electronically connected device and to predict an estimated size of the entire compressed output optimized image; and
   a network interface configured to transmit said compressed output optimized image and said compressed output optimized image estimated size to a networked device, the compressed output optimized image estimated size being transmitted separately from the compressed output optimized image.

2. The digital imaging device as claimed in claim 1, wherein said image processor is further configured to provide periodically generated updates of said continuous tone original document image representation size estimate.

3. The digital imaging device as claimed in claim 2, wherein said image processor is further configured to provide with said periodically generated size estimate updates, an identifier for the digital imaging device.

4. The digital imaging device as claimed in claim 1 wherein said image processor is further configured to provide said compressed output optimized image estimated size using a lookup table that provides compression ratios based upon image content and image compression method.

5. The digital imaging device as claimed in claim 1 wherein said image processor is further configured to process one or more earlier scanned pages in a multiple page job to obtain a compression ratio for said one or more earlier scanned pages and estimate a size of said compressed output optimized image by applying said earlier page compression ratio to one or more later scanned pages in said multiple page job.

6. A method, comprising:
   performing the following steps using an image processor:
      receiving scanned image data that represents an original document image;
      based upon an original document image content, selecting a method of generating a compressed output image that corresponds to said scanned image data; and
      based upon said original document image content and said selected compression method, providing an estimated output size for the entire compressed output optimized image, the estimated output size being separate from the compressed output optimized image.

7. The method as claimed in claim 6 further comprising:
   querying a networked target device regarding a request to transfer said compressed output optimized image; and receiving a response to said query based upon a predicted size of said compressed output optimized image.

8. The method as claimed in claim 7 further comprising:
including with said networked target device query, a predicted output size for said compressed output optimized image; and
in response to said query, receiving an indication regarding the ability of said target device to authorize a transfer of an image having said estimated compressed output optimized image size.

9. The method as claimed in claim 7 further comprising including with said networked target device query, a request for information regarding an amount of storage space available to said target;
in response to said query, receiving an indication regarding said requested storage space information; and
determining whether said target device will authorize transfer of said compressed output optimized image by comparing said available target space storage information to said predicted compressed output image size.

10. The method as claimed in claim 7 further comprising:
receiving authentication data entered at a user interface;
submitting to said networked target device, a query that includes said authentication data;
receiving from said target device, a response relating to a validity of said authentication data; and
generating a message at said user interface if said target device response indicates that said authentication data is invalid.

11. The method as claimed in claim 7 further comprising:
receiving scanned image data that represents a next original document image;
based upon a content of said next original document image, selecting a method of generating a next compressed output optimized image that corresponds to said next original document image scanned image data;
based upon said next original document image content and said selected compression method, estimating a size of said next compressed output optimized image;
querying a networked target device regarding a request to transfer said next compressed output optimized image; and
receiving a response to said query based upon an estimated size of said next compressed output optimized image.

12. The method as claimed in claim 7 further comprising communicating said estimated next compressed output optimized image size to said networked target device as said next original document image is scanned.

13. The method as claimed in claim 7 further comprising:
with said estimated next compressed output optimized image size, sending said target device information that identifies a sending device; and
recording an updated estimated size for said next compressed output optimized image with an associated sending device identifier.

14. The method as claimed in claim 7 further comprising communicating said estimated compressed output optimized image size to said networked target device as said next original document image is compressed.

15. A data receiving device, comprising:
a polling data receiver configured to receive a query that provides an estimated size of an entire compressed output optimized image being generated by a remote device; and
a polling data transmitter configured to respond to said query by indicating whether a compressed output optimized image having a size approximately equal to said compressed output optimized image estimated size will be accepted by the data receiving device.

16. The data receiving device as claimed in claim 15 further comprising an available storage space calculator that maintains information regarding an amount of storage space that is available to the data receiving device for storing said compressed output optimized images.

17. A data receiving device, comprising:
a polling data receiver configured to receive a query from a remote device that includes an identifier for said remote device and an estimated size of an entire compressed output optimized image being generated by said remote device, the estimated size being separate from the compressed output optimized image; and
a polling data transmitter configured to transmit a response to said remote device that indicates whether the data receiving will accept a compressed output optimized image having a size approximately equal to said compressed output optimized image size estimate.

18. The data receiving device as claimed in claim 17 further comprising an available storage space recorder that maintains a record of an amount of space available to the data receiving for storing compressed output optimized images that includes each received remote device identifier and its associated compressed output optimized image estimated size.

19. The data receiving device as claimed in claim 18 wherein said available storage space calculator records updated available storage space information when a query received from a remote device includes a remote device identifier.

20. The data receiving device as claimed in claim 18 wherein said available storage space recorder is configured to store each compressed output optimized image estimated size in an object oriented database with said associated remote device identifier.

* * * * *